United States Patent [19]
Nobel et al.

[11] Patent Number: 5,522,972
[45] Date of Patent: Jun. 4, 1996

[54] NICKEL HYPOSPHITE MANUFACTURE

[75] Inventors: Fred I. Nobel, Sands Point; William Brasch, Nesconset; Donald Thomson, Northport; Luis H. Garay, Rockville Centre, all of N.Y.

[73] Assignee: LeaRonal, Inc., Freeport, N.Y.

[21] Appl. No.: 277,339

[22] Filed: Jul. 19, 1994

[51] Int. Cl.⁶ .................................................. C25B 1/00
[52] U.S. Cl. ................................................ 205/488
[58] Field of Search ........................... 204/90, DIG. 13

[56] References Cited

U.S. PATENT DOCUMENTS 5,225,052  7/1993  Takikawa ........................ 204/90

FOREIGN PATENT DOCUMENTS 63-303078  12/1988  Japan .

OTHER PUBLICATIONS

Metal Finishing Handbook, Metals & Plastics Pub. Inc. (1987) (month not available).
Chem. Abs. vol. 76, 1972, 47867x, "Nickel(II) hypophosphite". Svehla, Pavel, Czech. 139,245, 15 Dec. 1970.
Chem. Abs., vol. 81, 1974, 172399a, "Nickel hypophosphite with a low iron content". Svehla, Pavel, Czech. 152,901, 15 Apr. 1974.
Tsaka et al., Denki Kagaku Oyobi Kogyo Butsuri Kagaku, 45(6), 380–5 (1977) month not available.
Hongyu et al., "Electrolytic Regeneration of Electroless Nickel (Ni) Solution," Electroplating & Polution Control, vol. 13, No. 2, Mar. 1993 (with translation).

Primary Examiner—John Niebling
Assistant Examiner—Brendan Mee
Attorney, Agent, or Firm—Lerner, David, Littenberg, Krumholz & Mentlik

[57] ABSTRACT

A method for preparing nickel hypophosphite by contacting a nickel anode with a solution of hypophosphite anions and applying a current through the anode to a counter-electrode in contact with the solution to anodically dissolve the nickel of the anode into the hypophosphite solution, thereby forming a nickel hypophosphite solution. A one-compartment electrolysis cell and a three-or-more-compartment electrodialysis cell embodying the method of the invention are described.

38 Claims, 3 Drawing Sheets

NICKEL HYPOPHOSPHITE MANUFACTURE

BACKGROUND OF THE INVENTION

The present invention relates to the manufacture of nickel hypophosphite for use in electroless nickel plating, and more particularly, to the manufacture of nickel hypophosphite by anodically dissolving nickel metal into a solution containing hypophosphite anions. The present invention provides a significant improvement in the means by which nickel hypophosphite may be produced efficiently and inexpensively.

Nickel phosphorus alloys have been deposited for many years by chemical reduction from solutions known in the industry as "electroless nickel plating baths." The deposits from these baths are in widespread use throughout industry on parts as large as oil drilling equipment and as small as watch movements.

The conventional electroless nickel plating baths used throughout the industry contain nickel sulfate, sodium hypophosphite, chelating or complexing agents, buffers and stabilizers. Replenishment is made with the same materials, as the bath is used. These plating solutions have limited life because there is a continual build-up of sulfate ion, sodium ion and phosphite ions from the oxidation of hypophosphite ion.

Attempts have been made to formulate electroless nickel plating baths with nickel hypophosphite and hypophosphorous acid, thus eliminating both sodium and sulfate ions, thereby giving the bath longer life. Baths of this type have been available in prior art literature and at least two commercial electroless nickel processes have been proposed using this type of formulation. The problem with these formulations is that nickel hypophosphite is very expensive and the increased cost of these processes does not warrant their commercial use, even though they represent improvements over the conventional formulations.

Nickel hypophosphite can be made by reacting hypophosphorous acid with nickel hydroxide or nickel carbonate or some other suitable nickel salt. The problem with this method is the high cost and limited availability of hypophosphorous acid. Furthermore, nickel in the form of the above salts is considerably more expensive than nickel in the form of sulfate that is in commercial use.

Czech Patents 139,245 and 152,901 describe methods for producing nickel hypophosphite which do not use the expensive hypophosphorous acid. In these patents, nickel nitrate in aqueous solution is mixed with aqueous sodium hypophosphite. Nickel hypophosphite crystallizes out of solution because it is the least soluble material in the mixture and is easily separated. This method of producing nickel hypophosphite is very simple; however, there is enough sodium hypophosphite and nickel nitrate left in solution to cause this method to be very expensive.

There remains a need for an efficient, inexpensive means by which nickel hypophosphite may be manufactured.

SUMMARY OF THE INVENTION

It has now been discovered that hypophosphite ions will not be oxidized to phosphite or phosphate ions by electrolysis using a nickel anode. On the contrary, in the anodic reaction, the nickel metal is dissolved to form nickel ions without oxidation of the hypophosphite ions at the nickel anode. This is unexpected, because hypophosphite ions are a strong reducing agent, which would be expected to react at an anode during electrolysis, thereby becoming phosphite or phosphate, resulting in a loss of hypophosphite.

Therefore, in accordance with the present invention, there is provided a method for preparing nickel hypophosphite including the steps of:

contacting a nickel anode with a solution of hypophosphite anions; and applying a current through the anode to a cathode in electrical contact with the solution to anodically dissolve the nickel of the anode into the hypophosphite solution, thereby forming a nickel hypophosphite solution.

The method of the present invention can be performed in an electrolysis cell with dissolution of the nickel anode into solution, without any of the nickel plating onto the cathode. This is a surprising result, because it is quite unexpected that the nickel from the anode would not plate at all onto the cathode. If hydrochloric acid, for example, had been substituted for the acidic hypophosphite anion solution in an electrolysis cell, nickel would plate onto the cathode.

In an electrolysis cell, however, hydroxyl ions are generated at the cathode, with the liberation of hydrogen gas. This requires the use of strong solutions of hypophosphorous acid as the acidic hypophosphite anion solution utilized in these cells in order to maintain an acidic solution in the presence of the hydroxyl ions being generated. To overcome this requirement, one embodiment of the present invention employs a three-compartment electrodialysis cell, so that sodium hypophosphite can be used as a source of hypophosphite anions for the acidic solution in contact with the nickel anode.

In accordance with this embodiment of the present invention, the method further includes the step of:

providing a hypophosphite salt solution separated from the anode by a membrane resistant to cation diffusion and from the cathode by a membrane resistant to anion diffusion before the step of applying the current to the anode.

Each of the foregoing embodiments produce nickel hypophosphite solutions that may be used directly in this form, or first concentrated and used as a concentrate, or crystallized out of solution and used as a dry crystal. Preferred methods for the manufacture of nickel hypophosphite utilize electrodialysis cells with three or more compartments, so that inexpensive hypophosphite salts may be employed as the source of hypophosphite anions.

BRIEF DESCRIPTION OF THE DRAWINGS

A more complete appreciation of the invention and many other intended advantages can be readily attained by reference to the following detailed description when considered in connection with the following drawings, wherein.

Figure 1:
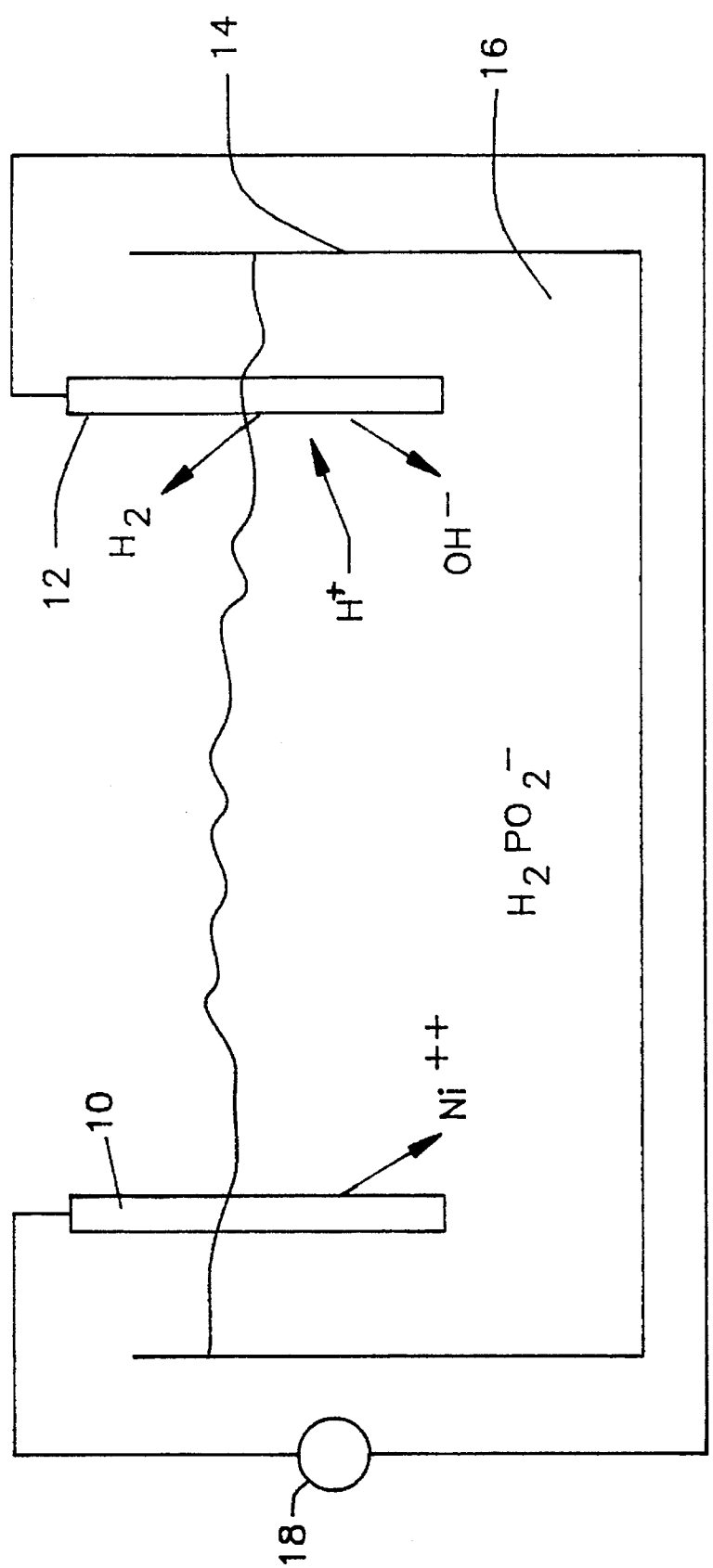
FIG. 1 shows a side view of an electrolysis cell embodying the method of the present invention.

It should be noted that the drawings are not necessarily to scale, but that certain elements have been expanded to show more clearly the various aspects of the present invention and their advantages.

DETAILED DESCRIPTION OF THE PREFERRED EMBODIMENT

The method of the present invention, in its simplest form, contacts a nickel anode with a solution of hypophosphite anions and applies a current through the anode to a cathode in electrical contact with the solution. The application of current anodically dissolves the nickel of the anode into the hypophosphite solution so as to form a nickel hypophosphite solution.

The solution of hypophosphite anions in contact with the nickel anode can have a pH less than about 7. Preferably, the pH of the solution is between about 1 and about 3.

Essentially any cathode material is suitable for use as the counter-electrode. Examples of suitable cathode materials include stainless steel, steel, graphite, platinum-coated titanium, and the like. The preferred cathode material is stainless steel.

Sufficient voltage should be supplied to the anode to create an anode current density between about 10 and about 100 amp/ft$^2$ (asf). A current density between about 20 and about 40 asf is preferred, and a current density of about 25 asf is more preferred.

With the application of current, the nickel anode dissolves at a high anode efficiency, without any plating of nickel onto the cathode. The acid protons are displaced at the cathode, where they are liberated as hydrogen gas, with the generation of hydroxyl anions.

In a single compartment cell, the generation of hydroxyl anions requires the use of hypophosphorous acid as the source of acidic hypophosphite anions, in order to maintain the solution acidity in the presence of the generated hydroxyl ions.

Generally, a $H_3PO_2$ solution having a concentration of at least 1M and a pH less than about 2 should be employed. Concentrations between about 1 and about 2M are preferred, having a pH between about 1 and about 2. The solution of hypophosphite ions should produce a solution which provides at least a double stoichiometric excess of acid protons over the moles of nickel dissolved from the anode, up to about a six-fold stoichiometric excess.

A much less expensive commercial source of hypophosphite ions are the alkali metal hypophosphites such as sodium hypophosphite, potassium hypophosphite, and the like. Alkali metal hypophosphites may be used as a source of the hypophosphite ions in a three-compartment electrodialysis cell.

In such a three-compartment cell, the middle compartment, containing the alkali metal hypophosphite solution, is separated from the compartment containing the nickel anode by a membrane resistant to cation diffusion, and from the compartment containing the cathode counter-electrode by a membrane resistant to anion diffusion. Membranes resistant to cation diffusion include anionic ion exchange membranes such as R5030 brand available from the Pall Corp. Membranes resistant to anion diffusion include cathodic ion exchange membranes available from DuPont under the brand name NAFION.

The anode compartment contains a solution known in the art as an anolyte and the cathode compartment contains a solution known as a catholyte. Before the application of a DC voltage supplied by a rectifier, generator, or battery, both the anolyte and the catholyte must be made conductive so that current will begin to flow as soon as a voltage is applied. The anolyte should thus contain a dilute solution of nickel hypophosphite and/or hypophosphorous acid, and the amount needed in the anolyte is merely enough to render the solution conductive to an electric current. About 5 g/l of nickel hypophosphite or a mixture of the two is sufficient. The anolyte starts with a dilute solution containing hypophosphite ions, and not some other conducting salt, because the anolyte should be kept free of extraneous ions that would interfere with the purity of the final product, namely, the nickel hypophosphite.

The catholyte can be made electrically conductive with any suitable conducting salt, provided only innocuous ions are introduced. Since the catholyte will eventually build up in an alkali hydroxide due to the liberation of hydrogen gas at the cathode during electrolysis, an alkali metal hydroxide is the preferred starting material, generally up to about a 0.1M solution of, for example, sodium hydroxide. Sodium hydroxide is thus preferred, and the amount required is merely enough to make the catholyte conductive to an electric current. About 5 g/l sodium hydroxide is sufficient.

The center compartment should contain a hypophosphite salt solution comprising at least a 1 Molar (M) solution of hypophosphite ions. Preferably, this compartment contains a strong alkali metal hypophosphite solution, at least a three-fold stoichiometric excess over the moles of nickel to be dissolved from the anode, up to about a six-fold excess. About a three-and-one-half-fold to about a five-fold excess of alkali metal hypophosphite is even more preferred.

The hypophosphite anions of the center compartment diffuse across the membrane resistant to cation diffusion to the anolyte, but are unable to diffuse across the membrane resistant to anion diffusion to the catholyte. Similarly, the alkali metal cation of the alkali metal hypophosphite is unable to diffuse across the membrane resistant to cation diffusion to the anolyte, but diffuses across the membrane resistant to anion diffusion to the catholyte.

When current is applied to the anode, the nickel is anodically dissolved into the anolyte, forming a nickel hypophosphite solution with the hypophosphite anions from the center compartment. The membrane resistant to cation diffusion retains the nickel cations in the anolyte. Similarly, the hydroxyl anions generated at the cathode with the liberation of hydrogen gas are retained in the catholyte by the membrane resistant to anion diffusion.

Those of ordinary skill in the art will understand that electrodialysis cells having even greater numbers of compartments can be devised, sandwiching compartments containing strong alkali metal hypophosphite solutions between nickel anode compartments containing the above-described anolyte and cathode counter-electrode compartments containing the above-described catholyte, which compartments are separated by the above-described ion exchange membranes. Such an arrangement allows for the large-scale highly-efficient commercial production of nickel hypophosphite.

Figure 2:
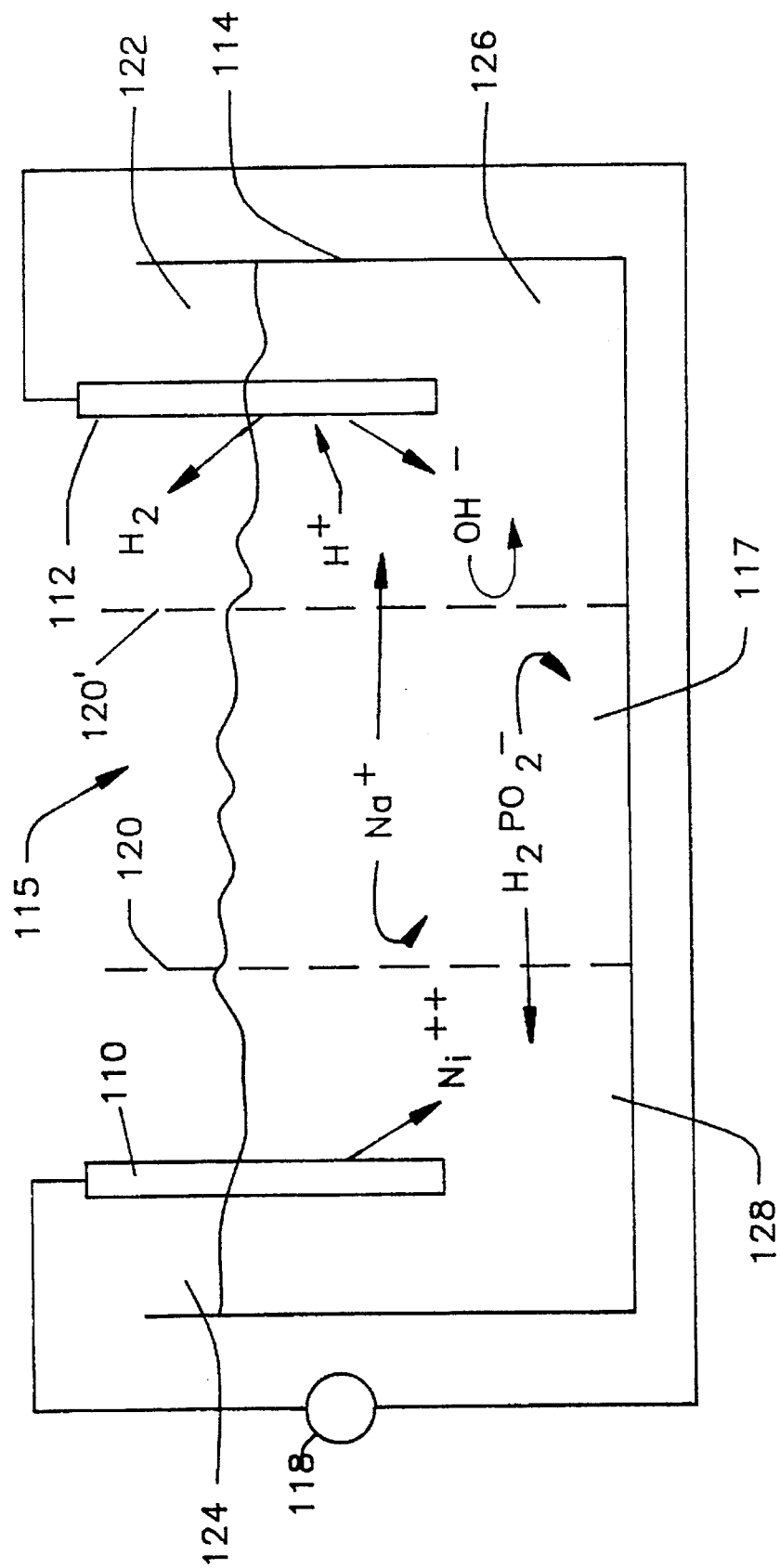
FIG. 2 shows a side, cross-sectional view of a three-compartment electrodialysis cell embodying the method of the present invention.
Figure 3:
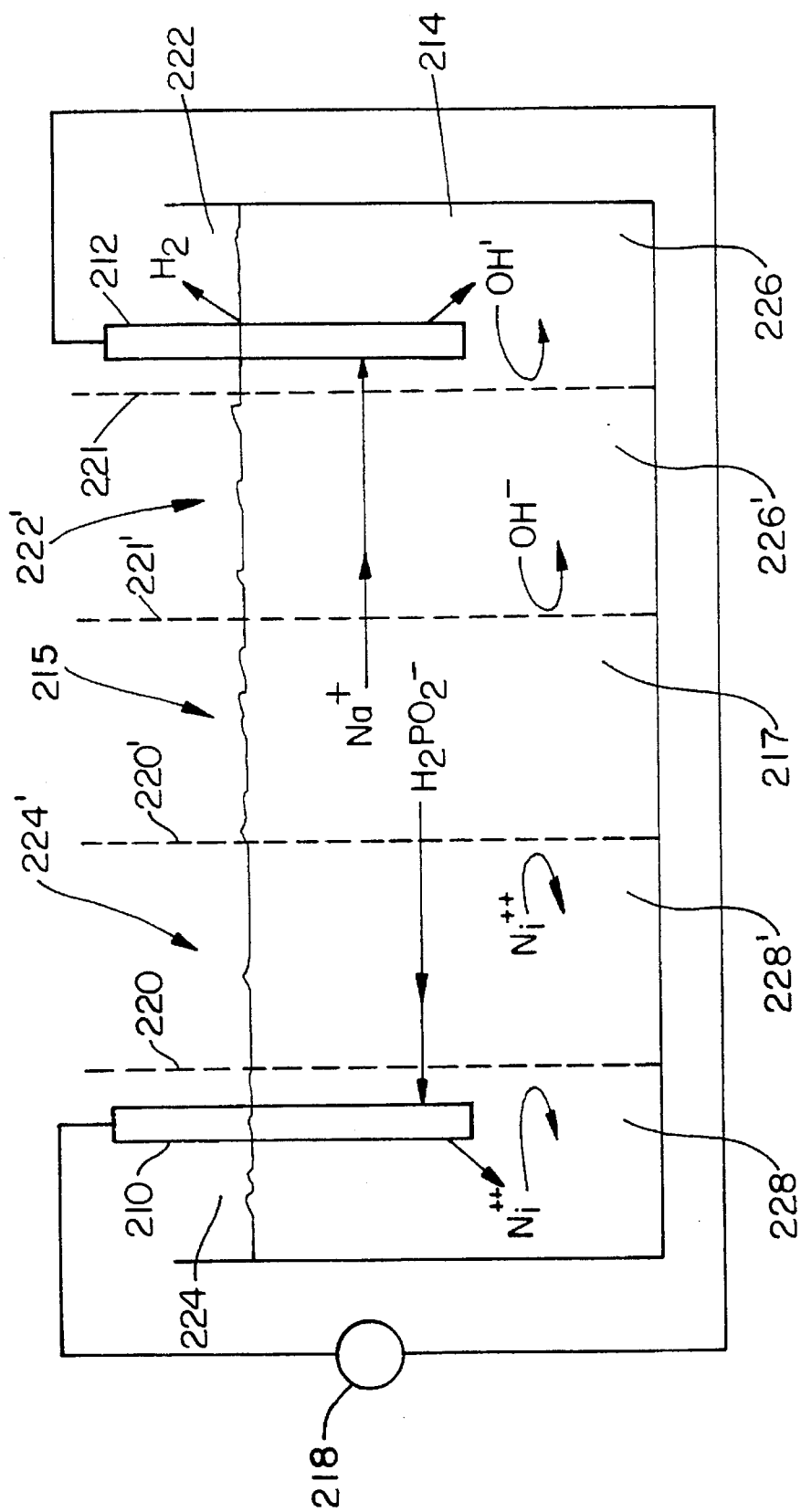
FIG. 3 shows a side, cross-sectional view of a five-compartment electrodialysis cell embodying the method of the present invention.

One example of a highly preferred embodiment of such a multi-compartment cell is shown in FIG. 3. It is known that ion exchange membranes used in electrodialysis are not 100% perfect, and that a small amount of undesired leakage can take place there across. For this reason, the five-compartment cell shown in FIG. 3 can be utilized. That is, when the hydroxyl ion concentration in the catholyte in the cell of FIG. 2 builds up to a sufficiently high value, a small amount of that hydroxyl ion can tend to leak across the cation exchange membrane into the center compartment. This, in turn, can adversely effect the pH in that compartment. Similarly, when the $Ni^{+2}$ concentration in the anolyte compartment builds up to a sufficiently high value, a small amount of these $Ni^{+2}$ ions can leak across the anion exchange membrane into the center compartment. This would represent an undesirable loss of nickel from the anolyte.

Referring to FIG. 3, buffer cells can be utilized to protect the center compartment. That is, by adding a second cationic membrane, a catholyte buffer cell is created between the catholyte compartment and the center compartment. Therefore, even in the case where the hydroxyl ion concentration in the catholyte compartment builds up to the extent that some leakage occurred into the catholyte buffer cell, since the hydroxyl ion concentration in the catholyte buffer cell would not build up to any significant extent, leakage of hydroxyl ion into the center compartment would be effectively prevented. In order to produce an operating cell, the catholyte buffer cell should include a starting solution which contained a dilute solution of electrically conductive innocuous ions just as in the case with the catholyte compartment as discussed above.

Similarly, by adding a second anionic membrane, an anolyte buffer cell can be created between the anolyte compartment and the center compartment. In this case, even if the $Ni^{+2}$ ion concentration in the anolyte compartment built up to the extent that some leakage occurred into the anolyte buffer cell, since the $Ni^{+2}$ ion concentration in the anolytes buffer cell would not build up to a significant extent, leakage of $Ni^{+2}$ ions into the center compartment would be effectively prevented. In this case, as with the catholyte buffer cell, in order to produce an operating cell, the anolyte buffer cell should initially include a starting solution containing a dilute solution of electrically conducting ions of the type used in the anolyte compartment as discussed above.

One of ordinary skill in the art will also understand that the acidic hypophosphite solutions of electrolysis cells, and the anolyte compartments of electrodialysis cells, can optionally also contain stabilizers, such as 2 ppm of lead ion, for example, and complexing agents, such as lactic acid, hydroxyacetic acid, succinic acid, ammonium ions, and the like.

For each embodiment of the method of the present invention, the nickel hypophosphite is recovered by drawing off the solution in contact with the anode, i.e., the sole solution of the electrolysis cell, or the anolyte solutions of the electrodialysis cells. The nickel hypophosphite thus produced can be sold in solution form, concentrated, or crystallized out of solution and sold as a dry crystal.

In the electrodialysis cells, the hydroxyl ion concentration of the catholyte solution increases as the nickel anode is dissolved anodically into the anolyte. Upon completion of the reaction, the catholyte solution may be discarded, or diluted for re-use. In electrodialysis cells containing three or more compartments, the concentration of the alkali metal hypophosphite compartment(s) decreases as the reaction progresses. This solution may be replenished and re-used.

An electrolysis cell embodying the method of the present invention is depicted in FIG. 1. Acidic hypophosphite solution 16 is disposed in contact with nickel anode 10 and stainless steel cathode 12 in electrolysis cell 14. The application of current from power source 18 anodically dissolves nickel from the anode 10 to form nickel hypophosphite in solution 16. Hydroxyl anions are generated at the cathode 12 with the liberation of hydrogen gas.

A three-compartment electrodialysis cell is depicted in FIG. 2. Anionic membrane 120 and cathodic membrane 121 separate electrodialysis cell 114 into three compartments. Anolyte compartment 124 contains anolyte solution 128 in contact with nickel anode 110. Catholyte compartment 122 contains catholyte solution 126 in contact with stainless steel cathode 112. Center compartment 115 contains a 2M solution 117 of sodium hypophosphite. The anolyte solution 128 is a solution containing about 0.03M nickel hypophosphite and/or about 0.1M $H_3PO_2$. Catholyte solution 126 is about a 0.1M solution of NaOH.

The application of current from power source 118 anodically dissolves nickel from the anode 110 into anolyte solution 128. Hypophosphite anions from the solution 117 in compartment 115 diffuse across membrane 120 to form a nickel hypophosphite solution in anolyte solution 128 with the nickel dissolved anodically from the anode 110. Hydroxyl anions are generated at the cathode 112, with the liberation of hydrogen gas from the catholyte solution 126.

A five-compartment electrodialysis cell is depicted in FIG. 3. Anionic membranes 220 and 220' and catholyte membranes 221 and 221' separate electrodialysis cell 214 into five compartments. Anolyte compartment 224 contains anolyte solution 228 in contact with nickel anode 210. Anolyte buffer compartment 224' contains anolyte buffer solution 228'. Catholyte compartment 222 contains catholyte solution 226 in contact with stainless steel cathode 212. Catholyte buffer compartment 222' contains catholyte buffer solution 226'. Center compartment 215 contains a 2M solution 217 of sodium hypophosphite. The anolyte solution 228 is a solution containing about 0.03M nickel hypophosphite and/or about 0.1M $H_3PO_2$. Anolyte buffer solution 228' is a solution containing a dilute solution of sodium hypophosphite and/or hypophosphorous acid. Catholyte solution 226 is about a 0.1M solution of NaOH. Catholyte buffer solution 226' is a dilute solution of alkali hydroxide.

The present invention satisfies a heretofore unmet need for a method by which nickel hypophosphite may be prepared from inexpensive raw materials. This reduces the cost of preparation of nickel hypophosphite for use in electroless nickel plating.

The following examples illustrate particular conditions, steps and materials within the scope of this invention, it being understood that these examples are given only by way of illustration and not limitation.

EXAMPLES

Example 1—Single-Compartment Electrolysis Cell

A single-compartment electrolysis cell was tested by immersing a 92.5 g nickel metal anode and a 81.4 g stainless steel cathode into a beaker containing a 1.0 L solution of $H_3PO_2$ at a concentration of 90 g/L. Both the anode and cathode had dimensions of 1.875×5.875×0.0625 inches (0.77 ft.$^2$ surface area). A current of 1.5 amps at 1.6 volts was supplied. The nickel anode dissolved at a high anode efficiency, close to 90%, with the production of hydrogen gas at the cathode. After 10¾ hours (16.13 amp hours) the reaction was stopped. The nickel anode was weighed, and showed a weight loss of 14.7 g. Analysis of the $H_3PO_2$ solution showed a nickel content of 15 g/L as nickel hypophosphite. The weight of the cathode did not increase, proving that no nickel was deposited on the cathode.

Example 2—Three-Compartment Electrodialysis Cell

A 6×8×11 inch container was separated into three compartments essentially as depicted in FIG. 2 using an R5030 anionic exchange membrane from the Pall Corp. and an RS010 cationic membrane from the Pall Corp. The container thus had a center compartment between the ion exchange membranes, with an anionic membrane between an anolyte solution compartment and the center compartment, and a cationic membrane between a catholyte solution compartment and the center compartment.

To the anolyte compartment 20 mL/L of 50% $H_3PO_2$ was added providing a hypophosphite anion concentration of 11.8 g/L and a pH of 1.27. To the center compartment was added 4.0 L of a sodium hypophosphite solution having a concentration of 200.0 g/L, and a pH of 5.35. To the catholyte solution compartment NaOH was added to form an NaOH solution having a concentration of 10.0 g/L and a pH of 13.3. An anode having a dimension of 5.75×6.0×0.0625 inches was immersed in the solution in the anolyte compartment, and a cathode having a dimension of 5.75×6.25×0.0625 inches was immersed in the solution in the catholyte compartment. All three solutions were at room temperature.

A current of 4.4 amps at 15 volts was supplied, providing a current density of 18 asf. Again, the nickel anode dissolved at a very high anode efficiency, close to 90%, with the production of hydrogen gas at the cathode. After 6 hours, the concentration of NaOH in the solution in the catholyte compartment had increased to 52.5 g/L.

After 12 hours and 20 minutes (54.27 amp hours) the reaction was stopped. Over the time of the reaction, a voltage drop from the initial 15 volts to 10 volts was experienced. The volume of the solution in the anolyte compartment had increased from 1.2 to 1.5 L. The pH had increased from 1.27 to 2.0. The hypophosphite anion concentration had increased from 11.8 g/L to 91.0 g/L. The solution in the anolyte compartment was determined by analysis to contain 27.0 g/L nickel as nickel hypophosphite. The solution was free, or substantially free, of orthophosphite anions. The temperature had increased from room temperature to 100° F.

In the center compartment, the volume of the sodium hypophosphite solution decreased from 4.0 L to 3.4 L. The sodium hypophosphite concentration decreased from 200 g/L to 150.0 g/L. The pH increased from 5.35 to 10.8, while the temperature increased from room temperature to 88° F. In the catholyte compartment, the solution volume increased from 1.2 L to 1.4 L, while the temperature increased from room temperature to 80° F. There was no increase in the weight of the cathode.

The foregoing examples demonstrate the high efficiency at which nickel hypophosphite may be produced from inexpensive raw materials by the method of the present invention. As will be readily appreciated, numerous variations and combinations of the features set forth above can be utilized without departing from the present invention as set forth in the claims. Such variations are not to be regarded as a departure from the spirit and scope of the invention, and all such modifications are intended to be included within the scope of the following claims.

What is claimed is:

1. A method for preparing nickel hypophosphite comprising the steps of:

contacting a nickel anode with an anolyte solution;

providing a hypophosphite salt solution separated from said anolyte by a membrane resistant to cation diffusion thereby defining an anode compartment comprising an anode consisting essentially of said nickel anode, whereby hypophosphite anions can pass through said membrane resistant to cation diffusion into said anolyte;

providing a cathode in electrical contact with a conductive catholyte solution;

separating said hypophosphite salt solution from said catholyte by a membrane resistant to anion diffusion, thereby defining a cathode compartment; and applying a current through said anode to said cathode to anodically dissolve the nickel of said anode into said anolyte, thereby forming a nickel hypophosphite solution.

2. The method of claim 1, wherein said anolyte solution has a pH less than about 7.

3. The method of claim 2, wherein said acidic anolyte solution has a pH between about 1 and about 3.

4. The method of claim 1, wherein said cathode comprises a material selected from the group consisting of stainless steel, steel, graphite, and platinum-coated titanium.

5. The method of claim 4, wherein said cathode is a stainless steel cathode.

6. The method of claim 1, wherein said current is applied to said anode at a current density between about 10 and about 100 asf.

7. The method of claim 6, wherein said current is applied to said anode at a current density between about 10 and about 100 asf.

8. The method of claim 7, wherein said step of recovering said nickel hypophosphite solution comprises crystallizing nickel hypophosphite crystals out of said solution and drying said nickel hypophosphite crystals.

9. The method of claim 1, wherein said anolyte solution further includes a stabilizer.

10. The method of claim 1, wherein said membrane resistant to cation diffusion consists of an anionic ion exchange membrane.

11. The method of claim 1, wherein said hypophosphite salt solution comprises at least a 1M solution of hypophosphite anions.

12. The method of claim 1, further comprising the step of initially contacting said cathode before electrolysis with an alkali metal hydroxide solution.

13. The method of claim 12, wherein said alkali metal hydroxide solution comprises about a 0.1M solution of sodium hydroxide.

14. The method of claim 1, further comprising the step of recovering said nickel hypophosphite solution.

15. The method of claim 14, wherein said step of recovering said nickel hypophosphite solution comprises the step of concentrating said nickel hypophosphite solution.

16. The method of claim 1, wherein said hypophosphite salt solution is separated from said anode by a pair of said membranes resistant to cation diffusion, thereby providing an anolyte buffer solution between said pair of membranes resistant to cation diffusion.

17. The method of claim 16, wherein said membranes resistant to cation diffusion comprise anionic ion exchange membranes.

18. The method of claim 1, wherein said hypophosphite salt solution is separated from said cathode by a pair of said membranes resistant to anion diffusion, thereby providing a catholyte buffer solution between said pair of said membranes resistant to anion diffusion.

19. The method of claim 1, wherein said solution of hypophosphite anions has a pH between about 1 and 3.

20. The method of claim 19, wherein said solution of hypophosphite anions has a pH between about 1 and 2.

21. A method of preparing nickel hypophosphite comprising the steps of:

contacting a nickel anode with a solution of hypophosphite anions;

applying a current through said anode to a cathode in electrical contact with said solution to anodically dissolve the nickel of said anode into said hypophosphite solution, said hypophosphite solution containing a $H_3PO_2$ solution of a concentration to provide sufficient hypophosphite anions to combine with said anodically dissolved nickel to form a nickel hypophosphite solution; and recovering and concentrating said nickel hypophosphite solution.

22. The method of claim 21, wherein said solution of hypophosphite anions comprises an $H_3PO_2$ solution providing at least a double stoichiometric excess of acid protons over the moles of nickel dissolved from said anode, up to about a six-fold stoichiometric excess.

23. A method of preparing nickel hypophosphite comprising the steps of:

contacting a nickel anode with an anolyte solution;

providing a hypophosphite salt solution separated from said anolyte by a membrane resistant to cation diffusion, whereby hypophosphite anions can pass through said membrane resistant to cation diffusion into said anolyte;

providing a cathode in electrical contact with a conductive catholyte solution;

separating said hypophosphite salt solution from said catholyte by a membrane resistant to anion diffusion; and applying a current through said anode to said cathode to anodically dissolve the nickel of said anode into said anolyte without controlling the pH of said anolyte, thereby forming a nickel hypophosphite solution.

24. The method of claim 23, wherein said solution has a pH between about 1 and about 3.

25. The method of claim 23 said current is supplied to said anode at a current density between about 10 and about 100 asf.

26. The method of claim 23, wherein said membrane resistant to cation diffusion consists of an anionic exchange membrane.

27. The method of claim 26, wherein said hypophosphite salt solution comprises at least a 1M solution of hypophosphite anions.

28. The method of claim 26, further comprising the step of initially contacting said cathode before electrolysis with an alkali metal hydroxide solution.

29. The method of claim 28, wherein said alkali metal hydroxide solution comprises about a 0.1M solution of sodium hydroxide.

30. A method for preparing nickel hypophosphite comprising the step of:

contacting an anode consisting essentially of a nickel anode with a solution of hypophosphite anions; and applying a current through said anode to a cathode in electrical contact with said solution to anodically dissolve the nickel of said anode into said hypophosphite solution, said hypophosphite solution being a $H_3PO_2$ solution and containing sufficient hypophosphite anions to combine with said anodically dissolve nickel to form a nickel hypophosphite solution therein.

31. The method of claim 30, wherein said solution of hypophosphite anions has a pH of less than about 7.

32. The method of claim 31, wherein said acidic solution of hypophosphite anions has a pH between about 1 and about 3.

33. The method of claim 30, wherein said current is applied to said anion at a current density between about 10 and about 100 asf.

34. The method of claim 30 wherein said solution of hypophosphite anions comprises an $H_3PO_2$ solution providing at least a double stoichiometric excess of acid protons over the moles of nickel dissolved from said anode, up to about a six-fold stoichiometric excess.

35. The method of claim 30 wherein said solution hypophosphite anions further includes a stabilizer.

36. A method for preparing nickel hypophosphite comprising the steps of:

contacting a nickel anode with a solution of hypophosphite anions;

applying a current through said anode to a cathode in electrical contact with said solution to anodically dissolve the nickel of said anode into said hypophosphite solution; said solution of hypophosphite anions comprising an $H_3PO_2$ solution providing at least a double stoichiometric excess of acid protons over the moles of nickel dissolved from said anode, up to about a six-fold stoichiometric excess, thereby forming a nickel hypophosphite solution; and recovering and concentrating said nickel hypophosphite solution.

37. A method for preparing nickel hypophosphite comprising the step of:

contacting an anode consisting essentially of a nickel anode with a solution of hypophosphite anions; and applying a current through said anode to a cathode in electrical contact with said solution to anodically dissolve the nickel of said anode into said hypophosphite solution, said solution of hypophosphite anions having a pH of between about 1 and about 3, whereby nickel hypophosphite solution is formed therein.

38. A method for preparing nickel hypophosphite comprising the step of:

contacting an anode consisting essentially of a nickel anode with a solution of hypophosphite anions; and applying a current through said anode to a cathode in electrical contact with said solution to anodically dissolve the nickel of said anode into said hypophosphite solution, said solution of hypophosphite anions comprising an $H_3PO_2$ solution providing at least a double stoichiometric excess of acid protons over the moles of nickel dissolved from said anode, up to about a six-fold stoichiometric excess, whereby nickel hypophosphite solution is formed therein.

* * * * *

UNITED STATES PATENT AND TRADEMARK OFFICE
CERTIFICATE OF CORRECTION

PATENT NO. : 5,522,972
DATED : June 4, 1996
INVENTOR(S) : Nobel et al.

It is certified that error appears in the above-identified patent and that said Letters Patent is hereby corrected as shown below:

Column 7, line 1, delete "RS010" and insert therefor --R5010--.
Column 10, line 2, "dissolve" should read --dissolved--.
Column 10, line 17, following "solution" insert --of--.

Signed and Sealed this

Twenty-fourth Day of September, 1996

Attest:

BRUCE LEHMAN

Attesting Officer     Commissioner of Patents and Trademarks